United States Patent [19]
Sargent

[11] 4,366,372
[45] Dec. 28, 1982

[54] APPARATUS AND METHOD FOR COUNTING REPETITIVE MARKS ON A RUNNING WEB

[75] Inventor: Jack Sargent, Silver Spring, Md.

[73] Assignee: Innovative Design, Inc., Silver Spring, Md.

[21] Appl. No.: 180,360

[22] Filed: Aug. 22, 1980

Related U.S. Application Data

[62] Division of Ser. No. 44,384, Jun. 1, 1979, Pat. No. 4,317,989.

[51] Int. Cl.³ .................................... G06M 9/00
[52] U.S. Cl. ....................... 235/92 PL; 235/92 V; 235/92 CC
[58] Field of Search .......... 235/92 PL, 92 V, 92 DN, 235/92 EC, 92 CC; 371/65; 364/571

[56] References Cited

U.S. PATENT DOCUMENTS

| 2,522,479 | 9/1950 | Crafts | 270/52 |
|---|---|---|---|
| 2,548,136 | 4/1951 | Auer | 271/26 |
| 3,068,787 | 12/1962 | Dall'oglio et al. | 101/181 |
| 3,102,471 | 6/1963 | Auer et al. | 101/181 |
| 3,264,983 | 8/1966 | Lewis et al. | 101/181 |
| 3,294,301 | 12/1966 | Richter | 226/27 |
| 3,371,834 | 3/1968 | Willits et al. | 226/27 |
| 3,397,634 | 8/1968 | Betts et al. | 101/248 |
| 3,439,176 | 4/1969 | Astley et al. | 250/219 |
| 3,510,036 | 5/1970 | Lewis et al. | 226/2 |
| 3,559,568 | 2/1971 | Stanley | 101/32 |
| 3,594,552 | 7/1971 | Adamson et al. | 235/92 MP |
| 3,601,587 | 8/1971 | Thiede | 235/92 CC |
| 3,624,359 | 11/1971 | Roote | 250/559 |
| 3,659,081 | 4/1972 | Piccione | 235/92 PE |
| 3,673,418 | 6/1972 | Whig | 250/548 |
| 3,774,016 | 11/1973 | Sterns et al. | 364/148 |
| 3,806,012 | 4/1974 | Roch | 226/2 |
| 3,813,523 | 5/1974 | Mohan et al. | 235/92 PL X |
| 3,845,281 | 10/1974 | Konisi et al. | 235/92 PL |
| 3,864,551 | 2/1975 | Oefinger | 235/92 PL X |
| 4,001,552 | 1/1977 | Muller | 235/92 DN |
| 4,007,866 | 2/1977 | Traise | 226/31 |
| 4,081,944 | 4/1978 | Sjostrand | 53/51 |
| 4,161,781 | 7/1979 | Hildebrandt et al. | 235/92 V X |

OTHER PUBLICATIONS

Printec-Tronic Advertising Material Printec-Tronic Throw Length Control System for Business Forms Presses Graphische Maschinenhandels GmbH Ventretungen Service Global Equipment, Inc., Tustin, Ca.

Primary Examiner—David H. Malzahn
Attorney, Agent, or Firm—Shapiro and Shapiro

[57] ABSTRACT

A series of holes spaced along the length of a running web is sensed optically and corresponding pulses are counted in a first counter to measure a standard length of the web. Simultaneously a running web length measurement is performed by an encoder wheel, which supplies encoder pulses to a second counter that counts down from a preselected number. When the count in the first counter reaches a selected value, the count in the second counter represents deviation of a measured "board length" from the standard, which is displayed digitally. In the event a pulse corresponding to a hole is not produced when it should be, a hole simulation pulse is generated to compensate for the missing pulse.

6 Claims, 22 Drawing Figures

APPARATUS AND METHOD FOR COUNTING REPETITIVE MARKS ON A RUNNING WEB

This is a divisional application of Ser. No. 044,384, filed June 1, 1979, now U.S. Pat. No. 4,317,989.

BACKGROUND OF THE INVENTION

This invention relates to the measurement of a reference length of a running web and is more particularly concerned with the measurement of "board length."

In the manufacture of certain types of multi-layer printed documents, it is common practice to provide a row of punched holes along a longitudinal edge of a paper web (e.g., holes at half inch intervals) which are later used for collation of the sheets. During the punching operation, which may be performed concurrently with the printing operation, the paper is under tension. After the paper leaves the press, it relaxes somewhat, resulting in a small dimensional change in hole spacing and paper length. This change is dependent upon such factors as infeed tension in the press and the width, thickness, and modulus of elasticity of the paper.

Although the dimensional changes are small, for example, +0.03%, the error in alignment between holes in the various sheet levels as the sheets are collated accumulates and is proportional to the length of paper being collated. Collators can compensate for some of the differences in hole spacing, but when the variance becomes excessive, rolls of paper may be unusable.

In order to assure uniformity of hole spacing at the various sheet levels, it is common practice to measure a reference length, termed a "board length" or "throw length," and to determine the deviation of the measured length from a standard. Heretofore, the board length has been determined by the following procedure. First the press is started and brought up to full operating speed. Then it is stopped and a ten foot section of paper is removed. This test sample is placed on a ten foot ruler and the distance between 240 holes (approximately ten feet) is measured. Based on this measurement, the operator adjusts the press tension to correct any offsets from the standard ten feet. A complete run is then made. The hope is that at a constant speed the hole spacing will not vary. While this is often the case, changes in paper quality, press tension, and press speed, or interruption of the operation of the press may change the board length. When board length varies and remains uncompensated, large amounts of paper may have to be rejected. Thus, a suitable apparatus and method for measuring board length continuously, i.e., on-line, is highly desirable.

BRIEF DESCRIPTION OF THE INVENTION

Accordingly, a principal object of the invention is to provide an improved apparatus and method for measuring a reference length (board length) of a running web.

Another object of the invention is to provide an apparatus and method of the foregoing type that permits the setting of an acceptable tolerance range of board length.

A further object of the invention is to provide an apparatus and method of the foregoing type in which a display indicates deviation from standard board length digitally, and another display indicates whether the board length is long, short, or acceptable (good).

A still further object of the invention is to provide an apparatus and method of the foregoing type in which an operator may set the board length deviation so as to match all webs to a selected standard.

Yet another object of the invention is to provide an apparatus and method of the foregoing type in which missing holes or "hangers" are accommodated by a hole signal simulation technique.

Still another object of the invention is to provide an apparatus and method of the foregoing type in which a measurement interval commences and terminates upon the sensing of holes punched by the same punch.

Yet another object of the invention is to provide an apparatus and method of the foregoing type that accommodates variations in puncher type and that accommodates imperfection in punch rollers.

A still further object of the invention is to provide an apparatus and method of the foregoing type that is immune to errors which could otherwise be produced by light from a strobe employed in web inspection.

An additional object of the invention is to provide apparatus of the foregoing type which avoids errors due to the effect of temperature upon an encoder wheel used in measurement of running web length.

Briefly stated, in one of its broader aspects the invention is used in a system having a running web with a multiplicity of reference marks substantially equally spaced along its length and is embodied in apparatus for measuring deviation of a reference length of the web from a standard length, the apparatus comprising means for counting the number of reference marks that pass a predetermined location, means for concurrently measuring the length of the web that moves past the location, means for detecting when the counting attains a predetermined value, and means for producing an output dependent upon the state of the length measuring means when the value is attained. In another aspect, the invention comprises, in apparatus for counting repetitive marks on a running web, means for sensing each mark and producing a pulse to be counted, and means for determining when such a pulse should have been produced and in the absence of such a pulse generating a pulse to be counted. In a further aspect, the invention comprises, in apparatus for counting successive marks on a running web, means for sensing the marks optically and for producing corresponding pulses to be counted, means for counting the pulses, and means for inhibiting the counting of the pulses except when the pulses are expected. Other aspects of the invention, with respect to both apparatus and methods of the invention, will become more apparent hereinafter.

BRIEF DESCRIPTION OF THE DRAWINGS

The invention will be further described in conjunction with the accompanying drawings, which illustrate a preferred and exemplary embodiment, and wherein.

DETAILED DESCRIPTION OF THE PREFERRED EMBODIMENT

Figure 1:
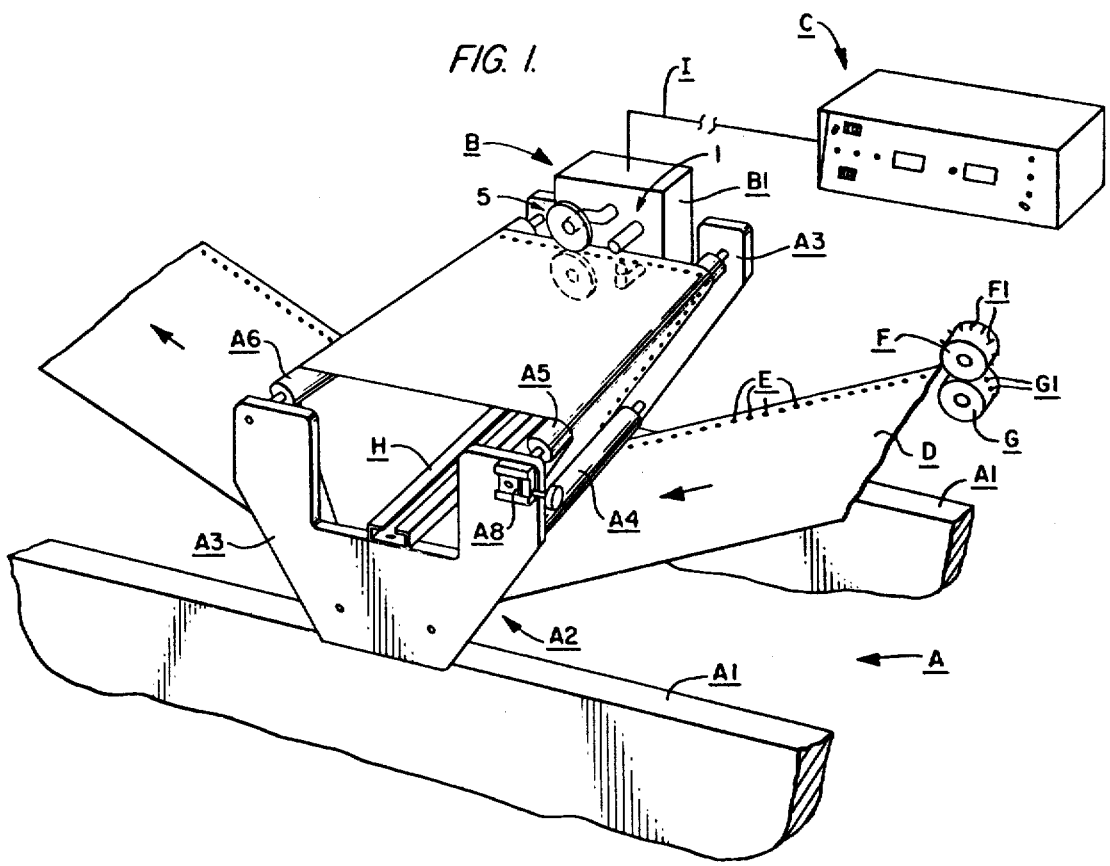
FIG. 1 is a fragmentary diagrammatic perspective view illustrating apparatus of the invention employed on a printing press.
Figure 2:
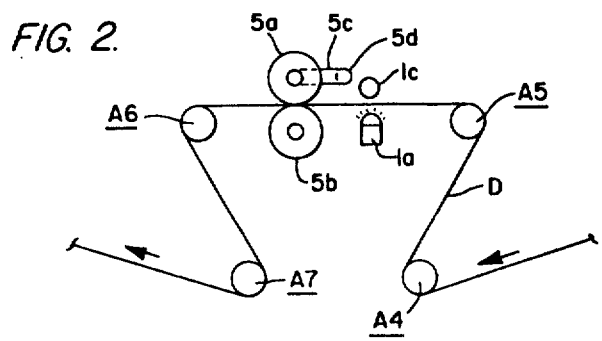
FIG. 2 is a diagrammatic view showing the path of a running web through a sensor unit in accordance with the invention.

For illustrative purposes, the invention will be described as employed in conjunction with a printing press, such as the press A shown diagrammatically in FIG. 1, but the invention may be employed in other types of web feed systems as well. In the preferred embodiment, the apparatus of the invention comprises a sensor unit B at the press and a remote main unit C. The printing press has a pair of frame members A1 upon which a roller assembly A2 may be mounted. The roller assembly may comprise a pair of frame plates A3 between which four rollers A4, A5, A6, and A7 (see FIG. 2) are rotatably mounted.

In the form shown, rollers A4–A7 are arranged in an upper pair and a lower pair, with the web D passing under roller A4 and then over rollers A5 and A6 and under roller A7 as shown, but the precise arrangement of rollers is not critical to the invention. The web D, which will be referred to as "paper" (although other webs may be used), is provided with a row of holes or reference marks E spaced substantially equally along a longitudinal edge of the web. For purposes of illustration of the invention, it is assumed that the holes have half-inch spacing, although one inch or other appropriate spacing may be employed. The holes are preferably punched by a conventional punch roll F shown diagrammatically. The punch roll has a plurality of punches F1 equally spaced about the circumference of the roll, and cooperates with a mating roll G having a plurality of depressions G1 spaced equally about its circumference for receiving the punches in a conventional manner. As the web D advances through the press, rolls F and G rotate in synchronism with the movement of the web and punch the holes E.

In general, the web may be fed past printing stations (not shown) of the press from a supply roll (not shown), past the punch roll and past the roller assembly A2 to a rewind unit (not shown). The rewind unit and various feed rollers of the press will normally be driven so as to provide desired tension in the web at various stations of the press which may be adjusted in a conventional manner, as by operation of a tension motor. The details of the press are not germane to the invention.

Sensor unit B may be supported on a cross bar H mounted between plates A3 to permit lateral adjustment of the sensor unit relative to the web. The sensor unit may comprise a housing B1 supporting two sensor assemblies 1 and 5 at one side thereof.

Figure 3:
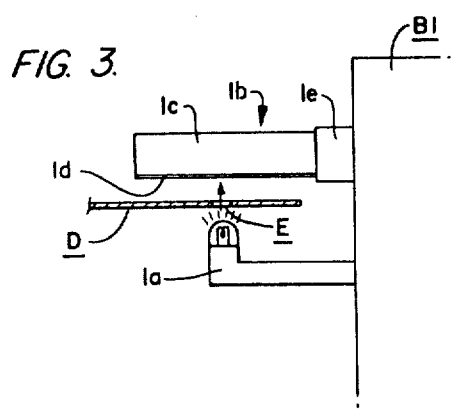
FIG. 3 is a diagrammatic elevation view illustrating an optical sensor assembly which may be employed in the invention.

In the preferred embodiment, sensor assembly 1 is an optical system and detector comprising an incandescent lamp 1a (light source) and a light sensor 1b at opposite sides of the web (see FIG. 3). Sensor 1b may comprise a cylindrical Plexiglass rod 1c for example, covered with a white coating except along a longitudinal rectangular slit 1d facing the web and except at the end of the rod adjacent to housing B1, where a photoelectric detector 1e receives light which enters slit 1d and is reflected internally along the rod. Each hole E produces a pulse of light that is converted into an electrical pulse, as will be described shortly.

Sensor assembly 5 is preferably an electromechanical assembly comprising a mechanical pickup, such as encoder wheel 5a and an idler wheel 5b at opposite sides of the web. These wheels are preferably located just inside the row of holes E. Wheel 5a may be mounted on a rotatable shaft at the end of a lever arm support 5c pivoted on housing B1 at 5d. The weight of wheel 5a may apply a pressure of about 1.2 pounds, for example, to the web backed by idler wheel 5b, which may be supported rotatably on a shaft that is fixed in position on housing B1.

The shaft of wheel 5a is connected to a conventional digital encoder 6 (FIG. 4) in the housing, for example an encoder such as the L-25 series sold by BEI of Goleta, Calif. The encoder wheel may have a circumference of 10 inches and may contact the web D over a wheel thickness of 0.0625 inch (the hub of the wheel being somewhat thicker), for example. The encoder may produce 200 electrical pulses per revolution of encoder wheel, for example.

As will be described hereinafter, the encoder wheel is employed to produce pulses which are counted to provide a measurement of the running length of the web. It is apparent that the diameter of the encoder wheel must be maintained very precisely if each revolution of the encoder wheel is to represent a precisely predetermined length of web. To prevent the diameter of the encoder wheel from changing significantly with temperature, the wheel is preferably machined from Invar 36, an alloy of nickel (36%), carbon (0.12%), manganese (0.90%), silicon (0.35%), selenium (0.20%), cobalt (trace), and iron (remainder), which has a temperature coefficient of expansion of $0.8 \times 10^{-6}/°C$. Over a temperature range of $\pm 20°$ C. (113° F. to 40° F.) the temperature-produced error with such a wheel is only about one-half a count, which is not significant.

Roller A5 may be an adjustable cocking roller which may be skewed or cocked somewhat by adjustment of a conventional screw mechanism A8 at one end of the roller to reduce the tension in the web adjacent to the sensor unit to a very low value.

Sensor unit B may be connected to a remote main unit C by a cable I for the transmission of optical pulses and encoder pulses from the sensor unit to the main unit. As will become apparent hereinafter, the main unit may have the following features:

(1) A digital readout display of board length (as the web is running).

(2) A digital selector that permits setting of acceptable tolerance range of board length.

(3) A board length match control which permits the operator to adjust the standard board length of difficult sheets (e.g., tag) so that all webs can be made to match a selected standard.

(4) A display which indicates if board length is long, short, or good (within range).

(5) A digital readout display showing the feet of paper consumed.

In accordance with the preferred embodiment of the invention, the optical detector produces pulses which are counted in a first counter until a selected count value is detected. If 2400 pulses are counted, for example, this represents 100 feet of web D passing the optical sensor (with assumed two pulses per inch). Concurrently, the mechanically driven encoder wheel produces pulses at a higher rate (for example, 20 pulses per inch, which is ten times the number of pulses produced by the optical detector per inch of web). The encoder pulses are counted in a second counter, which, as will be seen hereinafter, is preferably preset to a selected number and counts down in response to encoder pulses. When the selected optical pulse count value is detected, a predetermined count (e.g., zero) should have been reached in the encoder pulse counter if the actual board length is equal to a standard board length represented by the number of optical pulses counted. Otherwise, there will be a deviation of the measured length from the standard length.

Figure 4:
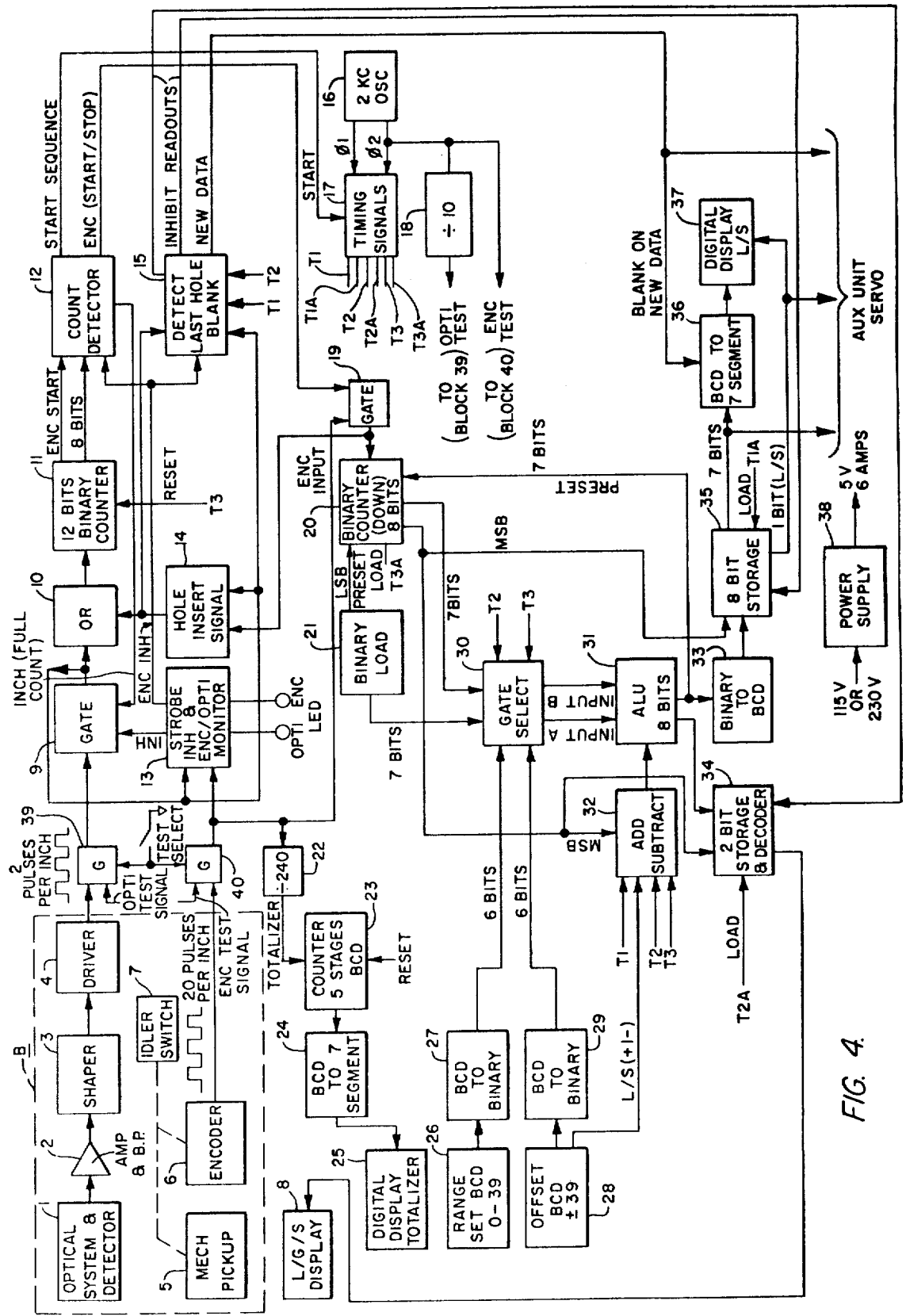
FIG. 4 is a block diagram of a preferred system in accordance with the invention.

A preferred system for performing the foregoing and other functions will now be described generally by reference to FIG. 4, and then certain portions of the system will be considered in detail. As shown in FIG. 4, the output of the optical system and detector 1 is passed through an amplifier and band pass filter 2 to a pulse shaper 3 and a driver 4, from which uniformly shaped, spaced optical pulses are fed to the main unit ("optical pulses" being electrical pulses corresponding to holes E). The mechanical pickup (encoder wheel) 5 drives encoder 6, which produces uniformly shaped, spaced encoder pulses which are fed to the main unit (which comprises what is shown in FIG. 4 outside of box B). An idler switch 7 may be employed to disable the encoder whenever wheel 5 is not in contact with the web.

Optical pulses from driver 4 are passed through a gate 39, a further gate 9, and an OR circuit 10 to a 12-bit binary counter 11, which serves as an optical pulse register. Eight bit outputs of counter 11 are connected to a count detector 12, which, as will be described, permits the operator to select the number (count value) at which a measurement cycle will terminate.

Encoder pulses from encoder 6 are passed through a gate 40 and a further gate 19 to an 8-bit binary counter 20, which operates in a down-counting mode and which serves as an encoder register. A number is preset in counter 20 from a binary load circuit 21 via a gate select circuit 30 and an arithmetic logic unit (ALU) 31. Range switches 26 permit the operator to set an acceptable range of board length deviation and are connected to the gate select circuit 30 by a BCD to binary converter 27. Offset switches 28 permit the operator to vary the preset number supplied to counter 20 by the binary load circuit 21 and are also connected to the gate select circuit 30 by a BCD to binary converter 29.

An add/subtract control circuit 32 determines whether the ALU 31 adds the signal at its B input to the signal at its A input or subtracts B from A. The signals of these inputs are selected by the gate select circuit 30.

The output of the ALU 31 provides the preset number to binary counter 20, as stated, and also supplies an output to a binary to BCD converter 33 and to a 2-bit storage and decoder circuit 34, which controls a long, short, "good" display 8. The output of the converter 33 supplies 7 bits to an 8-bit storage circuit 35, the eighth bit of which is supplied directly from the most significant bit (MSB) of counter 20. The 7 bits in storage circuit 35 are supplied to a BCD to 7-segment control circuit 36 which controls two digits of a digital display 37 so as to display the deviation of the measured board length from the standard board length. The eighth bit from storage 35 controls the digital display 37 to provide a ± indication indicative of a long or short board length condition.

A hole insert signal circuit 14 supplies a simulated hole pulse to counter 11 via OR circuit 10 when an actual hole pulse (optical pulse) should be present but is absent because a hole is incompletely punched (such a hole is called a "hanger"). As will be described in detail later, if the last hole counted by counter 11 in a measurement cycle is a simulated hole signal (or "blank"), a detect last hole blank circuit 15 inhibits readouts, and a new measurement cycle is initiated. If the last hole counted is genuine, a "new data" pulse is generated for updating of displays, for example.

A strobe inhibit circuit 13 inhibits the counting of optical pulses except for brief intervals during which pulses from the optical system and detector 1 are expected. This feature avoids errors due to light from a strobe used to inspect the moving web. LED indicators are shown connected to block 13 for monitoring the optical and encoder pulses, as will be described.

As noted earlier, the total length of web which passes through the press may be indicated on the main unit. For this purpose a ÷240 circuit 22 supplies pulses to a manually resettable 5-stage BCD counter 23, the output of which is connected to a BCD to 7-segment control circuit 24, which controls a digital display totalizer 25.

A two KC oscillator 16 supplies two phase master timing pulses to a timing signal generator circuit 17, which provides timing signals T1, T2, T3, T1A, T2A, T3A for the operation of the system, as will be described. Pulses from one phase of oscillator 16 are supplied to gates 39 and 40 (through a ÷10 circuit in the former case) for test purposes. When the "test select" switch (shown adjacent to these gates) is closed, the test pulses appear at the output of gates 39 and 40 instead of optical and encoder pulses.

A conventional power supply 38 supplies DC power for the system.

Reference will now be made to further block diagrams and accompanying timing diagrams for a detailed disclosure of the structure and function of certain portions of the system of FIG. 4. Then the operation of the complete system will be described in greater detail.

Figure 5:
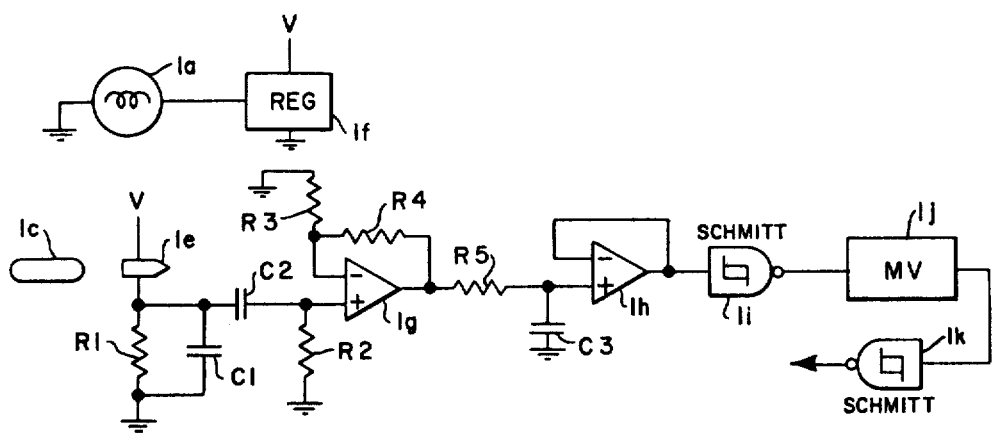
FIG. 5 is a partially schematic block diagram of an optical sensor circuit that may be employed in the invention.

A preferred optical system and detector is shown in FIG. 5. The voltage of lamp 1a is preferably regulated by a regulator 1f (e.g., to 2.5 volts) to extend the life of the lamp and to permit a long cable between the sensor unit and the main unit. The regulator may include an anti-surge circuit to limit the in-rush of current to the filament of the lamp when the lamp is first energized.

The light pipe 1c, which may be one inch long, for example, will pick up light when a hole appears and conduct the light to the photodetector 1e (which may be a phototransistor, for example). The use of the light pipe with a receptive slit along its length reduces the need to position the sensor box accurately with respect to the holes in the web, which may be only 5/32 of an inch in diameter, for example.

The low frequency cut-off provided by C2, R2 makes the system independent of the background ambient light (assuming that the light does not saturate the photodetector). A high frequency cut-off with a 12 DB/octave fall-off, for example, may be provided by C1, R1 and R5, C3, so that high frequency ambient light variations and electronic noise are filtered out.

Amplifier 1g is an operational amplifier having a gain of 50, for example, which is set by R3 and R4. Amplifier 1h may have unity gain. A Schmitt NAND 1i is used to provide pulse shaping. For example, when the signal rises to 2.2 volts, the output goes to 0 and when the signal falls to 1.0 volt, the output rises to 4.5 volts. The output of NAND 1i feeds a retriggerable multivibrator 1j which generates a 55 microsecond pulse, for example, so that the pulse width sent to the main unit is independent of press speed. A final Schmitt NAND 1k is employed as a line driver.

As noted earlier, the 12-bit binary counter 11 and count detector 12 are employed to count optical pulses until a predetermined count value is obtained. The number of optical pulses to be counted depends on the standard board length. In the manual measurement of board length in accordance with the prior art, a ten foot board length is usually used, for the following reasons: Collating machines can compensate for hole spacing variation in the various sheet levels over a range of ±0.03%. A measurement sensitivity of half this amount, or ±0.015%, is required. The unaided eye can discern 1/64 inch and therefore the minimum paper length required for measurement is 1/64÷0.00015=104 inch. Longer length of paper would increase the resolution, but this would require setting aside more space in the plant, and the handling of lengths of paper much greater than ten feet is cumbersome. As a result, a ten foot board length has become the norm for the industry, but board length ranges from 8 feet to 12 feet can be found in many plants.

The measurement of ten foot board lengths in an on-line system is not practical. At press speeds of 800 feet per minute, for example, which are common, readouts would occur every 0.75 second, a rate which is too rapid for an operator to make a decision or even to assimilate information. In addition, paper is not homogeneous, and measuring a single ten foot length does not produce a result which is representative of the average value of deviations in hole spacings. In the invention, any board length may be selected as the standard. The longer the length, the less stringent are the requirements for sensitivity. A 100 foot board length standard is preferred, because it can be readily converted to the previous industry standard of ten feet by dividing by ten. In effect, ten 10 foot board length measurements are made and averaged. This approach provides information that is meaningful, and, at an update rate of 7.5 seconds (at a press speed of 800 feet per minute) provides information that can be acted upon. With half inch hole spacing, for example, measurement of a hundred foot board length requires measurement of the length of the paper over a distance of 2400 holes. The deviations from 100 feet may be displayed in 0.1 inch increments (equivalent to 0.008%).

In determining the number of holes to be counted in each board length measurement cycle, there is another factor to consider, namely, the likelihood that the last hole in the series to be counted is incompletely punched (a "hanger"). In accordance with the invention, it is preferred that the same punch of a multiple punch roller produce the holes that start and stop the measurement cycle, for it is probable that if the first hole is punched properly, the same punch will produce a proper final hole. Presses are manufactured with punches that are spaced a half-inch apart around the periphery of a punch roller. The circumference of a roller on a particular press may be as small as 8 inches (16 punches) or as large as 30 inches (60 punches). Starting and stopping the measurement cycle on holes produced by the same punch requires that the punch roller rotate an integral number of revolutions. Assuming a standard board length of 100 feet, for example, the number of revolutions of the punch roller is that value which results in a length measurement which approaches or equals 100 feet (1200 inches). For example, assume a punch roller having a circumference of 22 inches (44 punches).

The number of revolutions =

$$\text{INTEGER}\left(\frac{1200}{22}\right) = 54 \text{ revolutions.}$$

The number of holes to be counted for one measurement cycle=54 (rev)×44 (punches)=2376 counts. The standard length is now 2376×½ (in)=1188 inches or 99 feet. It can be shown that for all rollers having 16 to 60 punches, the standard lengths to be measured range from 98 to 100 feet or a counting range of 98×12×2=2352 counts to 100×12×2=2400 counts.

The optical pulses are accumulated in 12-bit binary counter 11. For the range of interest, the resultant bit patterns are:

| Bit | 11 | 10 | 9 | 8 | 7 | 6 | 5 | 4 | 3 | 2 | 1 | 0 |
|---|---|---|---|---|---|---|---|---|---|---|---|---|
| 2400 | 1 | 0 | 0 | 1 | 0 | 1 | 1 | 0 | 0 | 0 | 0 | 0 |
| 2352 | 1 | 0 | 0 | 1 | 0 | 0 | 1 | 1 | 0 | 0 | 0 | 0 |

Figure 9:
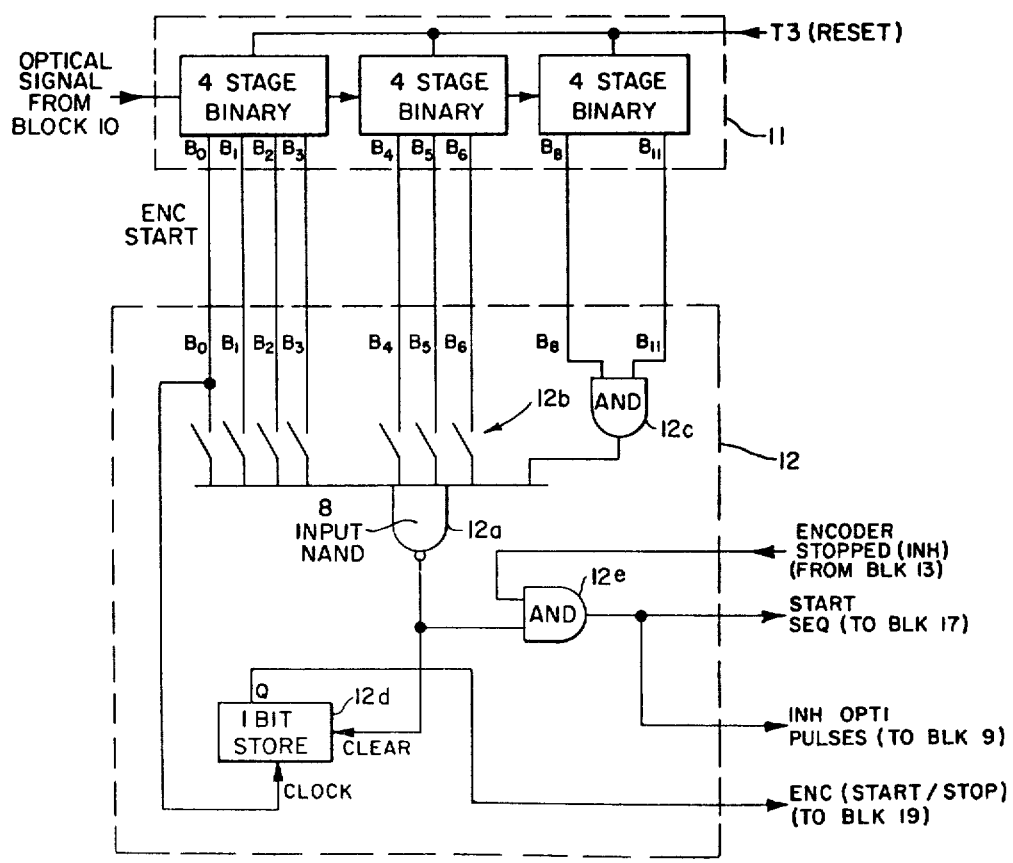
FIG. 9 is a block diagram illustrating in greater detail an optical signal register and count detector that may be employed in the system of FIG. 4.

FIG. 9 illustrates the 12-bit binary counter 11 in which optical pulses are accumulated and shows the association of the counter with the count detector 12, which permits the selection of a number to which the counter 11 counts to terminate a measurement cycle. To select the desired number a NAND 12a with 8 inputs is used. Switches 12b are provided for inputs from bits B0–B6 of counter 11. When any switch is open the input is high ("high" = logic "one" and "low" = logic "zero" throughout the description). When a switch is closed, the input is low until a signal (e.g., 5 volts) appears on the input conductor from counter 11.

If the number 2400 is to be detected, for example, it is necessary to determine the first time that bits B11, B8, B6 and B5 go high. This occurs when the other bits are low. If the counter continued beyond 2400, this condition would re-occur. However, the counter is inhibited from further counts (by gate 9) when the output of NAND 12a goes low (all inputs high).

To detect a count of 2400, switches 12b of inputs B6 and B5 are closed. Inputs B8 and B11 are hard-wired (permanently connected) as an input to NAND 12a through an AND 12c, since these bits always go high for the range of interest (2352–2400). Inputs for bits B7, B9, and B10 are not required for this range. It should be noted at this point that optical signal counter 11 counts the start hole as well as the succeeding holes. It is therefore necessary to set the count detector 12 to detect a value which is one count greater than the desired number.

Counter 11 is reset to zero by timing signal T3 after completion of a measurement cycle. Assuming that T3 has cleared the counter, the first optical pulse from block 10 (FIG. 4) changes B0 from low to high. This transition causes the Q output of a 1-bit store 12d to go high, which opens gate 19 (FIG. 4) and permits binary counter 20 (the encoder register) to start counting encoder pulses. Further transitions of B0 have no effect on the 1-bit store. When the output of NAND 12a goes low, that is, the desired count has been reached, the 1-bit store is cleared, closing gate 19 and inhibiting further counting in counter 20. Also, when the output of the NAND goes low, the output of AND 12e goes low, closing gate 9 (FIG. 4) which prevents further optical pulses from reaching counter 11. As will be seen later, when the output of AND 12e goes low, a timing signal sequence is started in block 17 (FIG. 4).

Block 13 (to be described in detail soon) applies a high signal to AND 12e as long as encoder pulses are received, i.e., when the press is operating. When the press stops, this signal and the output of AND 12e go low. Under this condition, the counting of optical pulses is inhibited, because gate 9 is closed. The start sequence output from count detector 12 to timing signal generator circuit 17 is now low also, and timing signals continue to be generated in sequence as will be described later.

As started earlier, binary counter 20 (the encoder register) is preset to a selected number and counts down in response to encoder pulses. If counter 20 where a countup register of adequate capacity and started counting from zero, the number reached at the end of a measurement cycle would be ten times the number attained by counter 11, assuming ten encoder pulses for each optical pulse. As stated earlier, it is desirable that the same punch produce the initial and final optical pulses in the measurement cycle, which requires an integral number of revolutions of the punch roller. Assuming that the number of punches on the punch roller is 44 and that the board length is to approach 100 feet, as in the example considered earlier, 54 revolutions of the punch roller will produce 2376 optical pulses. If the board length were "perfect," the encoder would produce 23760 encoder pulses, and this is the number that encoder register 20 would read at the end of a measurement cycle.

In accordance with the present invention, however, operation of the encoder register in a count-down mode is preferred, with the register being preset to a number and counting down in response to encoder pulses. The reading in the encoder register at the end of a measurement cycle can then be readily employed to determine deviation from perfect board length.

It has been determined, in practice, that a board length deviation of ±6.3 inches is sufficient to accommodate actual measurement conditions, and that counter 20 needs to accommodate only 8 bits. The least significant bit represents an error of 0.05 inch. Seven bits would accommodate 6.3 inches, but an additional bit is required since the absolute range is 12.6 inches.

With an 8-bit register 20, the register recycles many times during the measurement cycle. The method for determining the number to be set in register 20 is as follows: An eight bit register cycles every 256 counts, i.e., starting at zero, it is again zero after 256 counts. Since 23760 encoder pulses are assumed in the foregoing example, the number of completed cycles is INTEGER $\left( \frac{23760}{256} \right) = 92.$ The remainder is $23760 - (256 \times 92) = 208$. Therefore, the bit pattern of the number to be preset in register 20 is:

| B7 | B6 | B5 | B4 | B3 | B2 | B1 | B0 |
|----|----|----|----|----|----|----|----|
| 1  | 1  | 0  | 1  | 0  | 0  | 0  | 0. |

Now, by presetting the register to that value and counting down, the register will end at zero if the board length is perfect and if the encoder wheel diameter is perfect (i.e., each encoder count equivalent to 0.05 inch). If the encoder wheel is not perfect, a slight adjustment in the number will compensate for the error.

Figure 10:
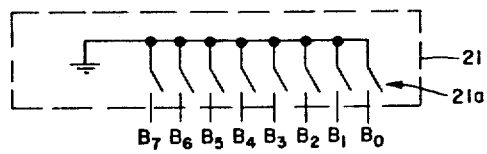
FIG. 10 is a schematic diagram illustrating binary load switches that may be employed in the system of FIG. 4.

Binary counter 20 may be preset to the desired number as follows:

As shown in FIG. 10, binary load 21 may comprise a series of eight switches 21a. One side of each switch is tied to ground. Closing the switch grounds the output lead, producing a low on that lead, while opening the switch produces a high. To preset the binary counter 20 to the number shown in the foregoing example, switches associated with leads B7, B6, and B4 would be opened and the others closed. This binary pattern is selected by gate select circuit 30 (FIG. 4) when timing signal T3 is produced, and the gate select circuit applies the pattern to input A of ALU 31. Input B receives the binary pattern established by the offset switches 28. Binary load switches 21a are internal switches, while the offset switches 28 are available to the operator to modify the number to be preset into counter 20 when a perfect board length is not possible, as will be described later. ALU 31 performs the operation A ± B and applies the result to register 20. The ± (long or short) is determined by a corresponding offset switch 28, which causes the add/subtract circuit 32 to produce addition or subtraction in ALU 31.

Figure 11:
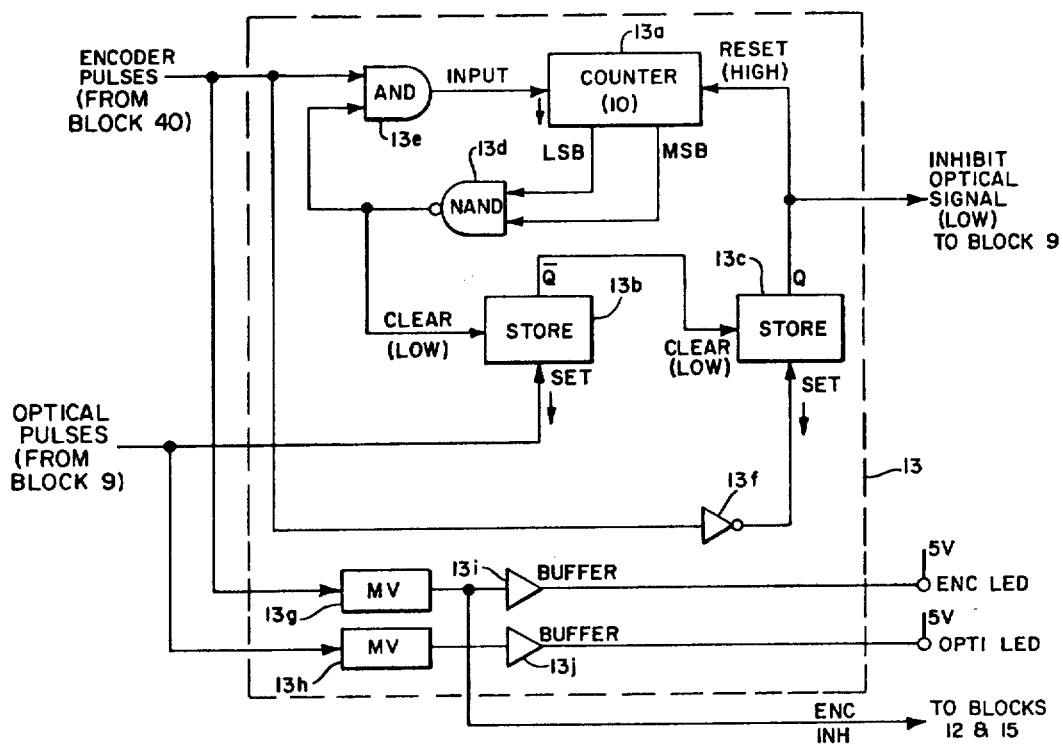
FIG. 11 is a block diagram illustrating in greater detail a strobe inhibit circuit and certain indicators that may be employed in the system of FIG. 4.
Figure 12:
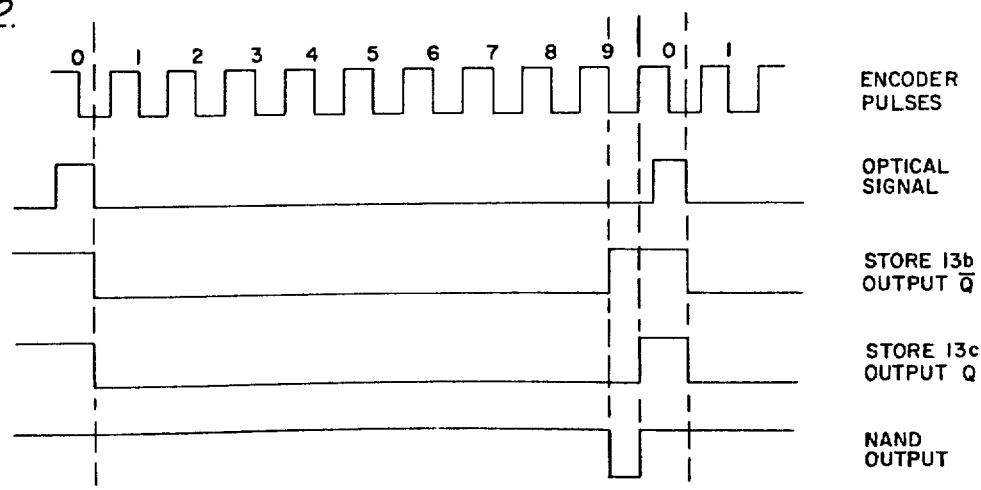
FIG. 12 is a timing diagram illustrating the operation of the circuit of FIG. 11.

FIGS. 11 and 12 illustrate the structure and operation of the strobe inhibit circuit 13 (including an associated monitoring circuit). The principal purpose of the strobe inhibit circuit, as will be recalled, is to avoid interference from strobe light. This is accomplished by inhibiting counting in the optical register except during brief intervals when optical pulses are expected. As shown in FIG. 11, a counter 13a counts ten encoder pulses (0 to 9) and then repeats the same cycle. Counting occurs when the input transitions from a high to a low, and the counter is reset to zero (all output bits low) when the reset lead is high. If the reset is high, transitions at the input will not advance the counter. The most significant bit (MSB) has a weight of 8 and the least significant bit (LSB) has a weight of 1. Both bits will be high when a count of 9 is reached.

Store 13b and store 13c are single bit flip-flops configured to change state when the set signal transitions from a high to a low and to remain in that state regardless of further transitions of the set signal. These stores will be reset when the clear signal is low. With the clear signal low, transitions of the set signal will not change the state of the stores. Output $\overline{Q}$ from store 13b is high when the circuit is cleared, and output Q from store 13c is low when that store is cleared. To inhibit counting of optical signals, output Q of store 13c must be low, so that gate 9 (FIG. 4) is closed.

Considering the operation of the above-described portion of the circuit of FIG. 11 in conjunction with the timing diagram of FIG. 12, assume that counter 13a has reached a count of 9 (MSB high and LSB high), which results in a low output from a NAND 13d. This low inhibits all further counting by counter 13a, since AND 13e has a low at one input. Also, store 13b is cleared, and its output $\overline{Q}$ goes high. This permits store 13c to be set when the next encoder pulse is received. Once store 13c is set, its output Q goes high. This resets counter 13a to zero, so that the NAND output goes high, and opens optical signal gate 9 to permit the next optical pulse to be received. The system will remain in this state until an optical pulse is received (that is, counter 13a will be held to zero by the high output of store 13c). Store 13c, once having been set, will remain in this state until cleared, and output $\overline{Q}$ of store 13b will remain high, once this store has been cleared, until this store is set by an optical pulse (from block 9 of FIG. 4).

With these conditions in effect, i.e., store 13b output $\overline{Q}$ high, store 13c output Q high, and the NAND output high, an optical pulse is received as shown in FIG. 12. At the falling edge of the optical pulse, store 13b is set and its output $\overline{Q}$ goes low. This in turn clears store 13c (its output Q goes low) which remains clamped in this state as long as its clear signal is low. There is no change in the high output of NAND 13d, since the counter 13a is at zero (MSB low, LSB low). With store 13c output Q low, and the NAND output high, counter 13a is enabled. In addition, store 13c output Q inhibits further optical pulses or other unwanted signals from entering the system.

As the encoder pulses transition from high to low as shown in FIG. 12, counter 13a advances. When it reaches a count of 9, the output of NAND 13d goes low, which inhibits further counting, via AND 13e, and clears store 13b ($\overline{Q}$ goes high). This in turn enables store 13c to be set with the next transition of the encoder pulse train, which, because of the inverter 13f, occurs when the encoder pulse train goes from low to high as shown in FIG. 12. With store 13c set (output Q high) counter 13a is reset to zero and held in this state, with gate circuit 9 open to permit the receipt of the next optical pulse.

In essence, by virtue of the strobe inhibit circuit, after an optical signal is received (or even an unwanted signal), the optical pulse gate 9 is closed by store 13c (output Q low) for an interval having a duration of about nine encoder pulses, and then the gate opens and waits for the next optical signal. If an unwanted signal occurs during the time that store 13c output Q is low, it is prevented from entering the system. If store 13c output Q is high and an unwanted signal occurs before the desired optical signal, it will be counted (as if it were the desired optical signal) and then store 13c will inhibit the good signal from entering the system. In any case, one and only one signal will be counted. Since the strobe inhibit circuit requires a real optical signal to function in the foregoing manner, it will not prevent unwanted signals from being counted when "hangers" are present. Also, it is assumed that the time interval between flashes is greater than the interval between detected holes. This is always the case, since the strobe flashes are synchronized with integral revolutions of the punch roller.

The circuit illustrated in FIG. 11 also includes a pair of multivibrators 13g and 13h connected through buffer amplifiers 13i and 13j to LED indicators 13k and 13l, which monitor the encoder system and the optical system, respectively. Whenever an encoder pulse or an optical pulse is present, an output from the corresponding multivibrator is produced. If one side of each LED is connected to a source of voltage, for example 5 volts, and if the output of each multivibrator has the same voltage, the LED's will turn off whenever the corresponding multivibrators produce an output and will turn on when no such output is produced. The timing of the multivibrators is set for a minimum press speed of say 50 feet per minute. Below this speed the multivibrators will time-out, causing the outputs to go to zero for a short period of time until the next pulse is received. The LED's will be quite dim at speeds slightly below 50 feet per minute and will be off at speeds above 50 feet per minute. When the press stops, and no encoder or optical pulses are produced, the LED's will be energized. Energization of an LED will also occur if there is a failure in the corresponding sensor system which prevents generation of encoder pulses or optical pulses.

During any 100-foot run, the probability that one or more holes will not be completely punched through is high. If such "hangers" are not accommodated in the measurement system, the final reading will be in error. In accordance with the invention, this problem is overcome by inserting a simulated or artificial hole pulse into the optical signal register when a real hole pulse should be present but is not.

Figure 6:
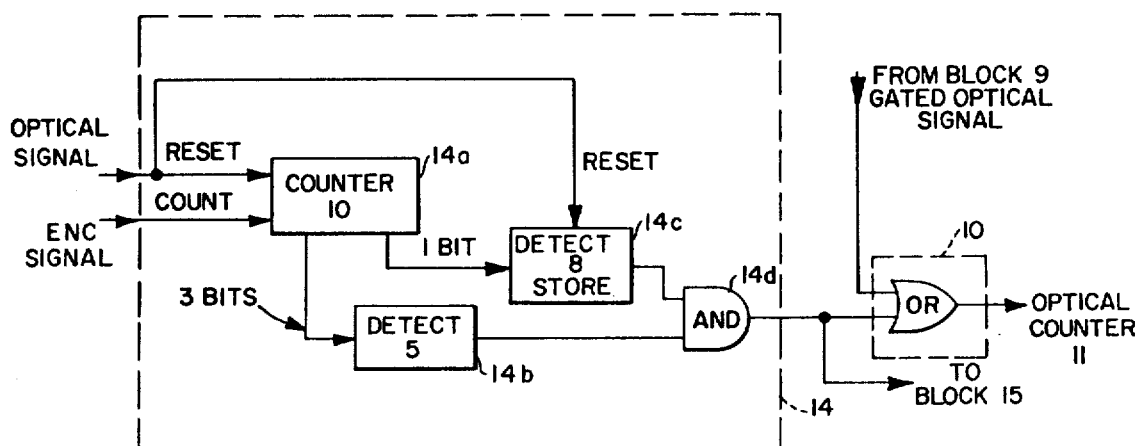
FIG. 6 is a block diagram illustrating in greater detail a hole signal simulation circuit that may be employed in the system of FIG. 4.
Figure 7:
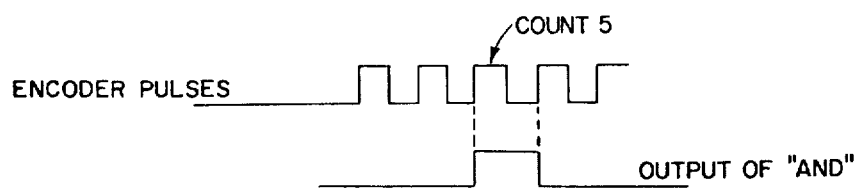
FIGS. 7 and 8 are timing diagrams illustrating the operation of the circuit of FIG. 6.
Figure 8:
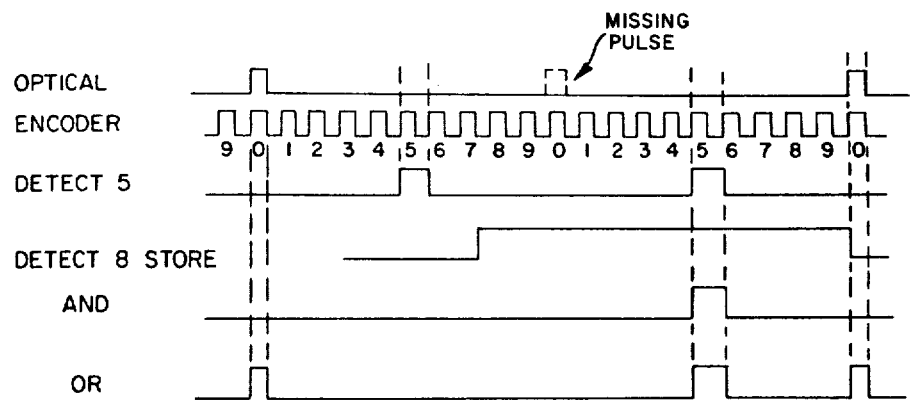

FIGS. 6–8 illustrate the structure and function of the hole insertion circuit 14. Counter 14a is a 4-bit binary counter configured to count ten encoder pulses (0 to 9) and then recycle. The detect 5 circuit 14b determines when the counter reaches binary 5, while the detect 8 store circuit 14c detects when the counter reaches binary 8 and stores that state until reset. Counter 14a and detect 8 store circuit 14c are reset by optical signals.

Assuming that counter 14a and detect 8 store circuit 14c are reset, when the counter reaches 5, the output of the detect 5 circuit will go high, but since the detect 8 store circuit will have a low output (when it is reset) no output will be produced from the AND 14d. When the counter reaches 8, the detect 8 store circuit will be set (producing a high output) but again there will be no output from AND 14d, because the output of the detect 5 circuit will now be low. When the tenth encoder pulse is received, a concurrent optical signal will reset the counter and the detect 8 store circuit. Thus, if optical signals are received normally, there will be no output from the hole insert circuit 14.

Now assume that the counter 14a and the detect 8 store circuit have been reset by an optical pulse, but that the next optical pulse is missing. When the counter reaches 8, the detect 8 store circuit will be set to produce a high output. As the counter continues to advance through the next cycle, and it reaches the number 5 again, the output of the detect 5 circuit will be high, and since the detect 8 circuit will not have been reset by an optical signal, both inputs of AND 14d will be high, and an output pulse will be supplied through OR 10 to the optical pulse counter 11. The width of the pulse will be equal to one encoder pulse cycle as shown in FIG. 7. FIG. 8 illustrates the complete sequence of events when an optical pulse is missing. In effect, a simulated or artificial optical pulse is produced after 15 encoder pulses from the last good optical pulse are received. If a good optical pulse is now received, it will occur after an additional 5 encoder pulses and will reset the counter and the detect 8 store circuit. If a series of optical pulses is missing, the first artificial pulses occurs after fifteen encoder pulses, but the remainder of the artificial pulses will be inserted every ten encoder pulses thereafter, because the detect 8 store circuit has not been reset and the detect 5 circuit will produce an output each time the count of 5 is reached. By using a count of 15 initially and then a count of 10 thereafter to produce simulated hole pulses, the simulated hole pulses are inserted midway between each missing hole pulse and the next expected hole pulse.

If the board length error is less than ±0.25 inch, then every hole could be a hanger, except the last hole, and still produce a good reading from the system. The maximum number of consecutive holes that can be accommodated and still produce an accurate readout is dependent on the board length. For a board length which is in error by 6 inches, a series of 100 hangers can be accepted. Once a good hole pulse has been received, then a second series of 100 hangers or less can be accommodated. This can continue until the final hole is reached, but the final hole pulse must be a real hole pulse to produce a measurement output, as will be described later.

Figure 13:
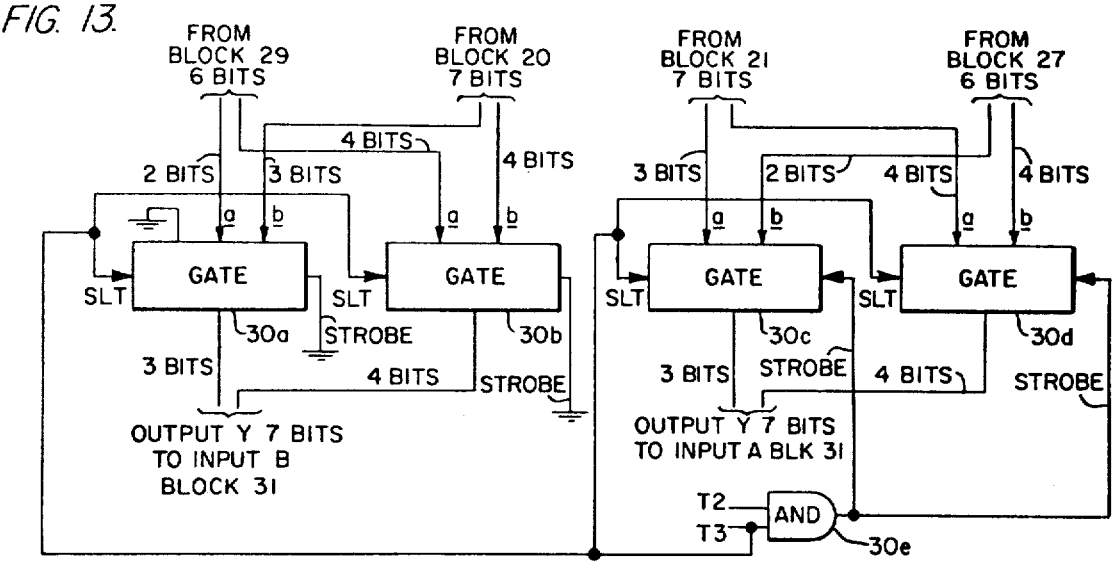
FIG. 13 is a block diagram illustrating in greater detail a gate select circuit that may be employed in the system of FIG. 4.

FIG. 13 illustrates the gate select circuit 30 of the preferred embodiment in greater detail. The gate select circuit may comprise four quadruple 2-line-to-1 line data selector multiplexer gates 30a–30d (e.g., type 74157) and an AND 30e. Gates 30a and 30c receive the most significant bits and gates 30b and 30d the least significant bits. Each of the gates can accept two 4-bit words at each input a and b. The output Y of each gate, which may have 4 bits, is determined by the state of the select (SLT) and the strobe input (no relation to the strobe light referred to earlier). The function table for each gate is as follows:

| STROBE | SELECT | INPUT a | INPUT b | OUTPUT Y |
|---|---|---|---|---|
| H | X | X | X | L |
| L | L | L | X | L |
| L | L | H | X | H |
| L | H | X | L | L |
| L | H | X | H | H |

H = high level
L = low level
X = irrelevant a and b and Y are each four bits, so that, for example, if the strobe=L and select=L, then each of the Y bits Y1, Y2, Y3 and Y4 would have the same level as the corresponding bits a1, a2, a3, a4, respectively.

The basic word structure for the gate select and ALU system is established by the eight bits of the encoder register 20. These bits may be designated B0 to B7 with B0 being the least significant bit (LSB) and B7 the most significant bit (MSB). B0 is preferably equivalent to a length of 0.05 inch as measured by the encoder wheel. B7 determines the sign, a zero being a short indication and a one a long indication.

As described later, at the end of a measurement cycle, timing signals T1, T2, T3 are generated consecutively. For each of the timing signal intervals T1, T2, T3, the operations to be performed b the ALU (e.g., a type 74181 chip), and the bit utilization is as follows:

During T1, the digital error in board length is determined by performing the operation 0±B, where B is the encoder register count consisting of bits B1 to B6. B7 determines the ± operation (via the add/subtract control circuit 32) as well as the L or S visual display in display 37. B1 to B6 (6 bits) provide a digital display range of 0 to 63. B0 is not displayed, since in the preferred embodiment the display is to the nearest 0.1 inch.

During T2, the in or out of range determination is made by performing the operation A±B, where A is the range setting (switches 26) and B is the encoder count in register 20. The A input consists of 6 bits having a maximum count of 39, for example. The ± is established by B7 of register 20, and the 6 bits of the range are aligned with B1 to B6 of the encoder register. B0 is ignored, since the range setting is preferably in increments of 0.1 inch.

During T3, the encoder register 20 is preset by performing the operation A±B, where A is the binary load 21 and B is the offset switch setting (switches 28), which consists of L or S and 6 bits having a range of 0 to 39 in 0.1 inch increments, for example. These 6 bits are aligned with B1 to B6 of the binary load. A zero is added to the offset range word in position B7 (see the ground input for gate 30a, input a). Bit B0 of the binary load is connected directly to the binary counter, since the setting of the offset is in 0.1 inch increments and bit B0 cannot affect the final calculation of the preset number. The ± is established by the L or S switch position.

The words that appear at the outputs of the gates or inputs to ALU 31 during the periods T1, T2, T3 are as follows:

| Period | Level T1 | T2 | T3 | STROBE GATE 30c and 30d | SLT GATE 30c and 30d | OUTPUT Y GATE 30c and 30d or INPUT A (ALU) | STROBE GATE 30a and 30b | SLT GATE 30a and 30b | OUTPUT Y GATE 30a and 30b or INPUT B (ALU) |
|---|---|---|---|---|---|---|---|---|---|
| T1: | L | H | H | 1 | 1 | 0 | 0 | 1 | COUNT DOWN REG. |

-continued

| Period | Level T1 | Level T2 | Level T3 | STROBE GATE 30c and 30d | SLT GATE 30c and 30d | OUTPUT Y GATE 30c and 30d or INPUT A (ALU) | STROBE GATE 30a and 30b | SLT GATE 30a and 30b | OUTPUT Y GATE 30a and 30b or INPUT B (ALU) |
|---|---|---|---|---|---|---|---|---|---|
| T2: | H | L | H | 0 | 1 | RANGE | 0 | 1 | COUNT DOWN REG. |
| T3: | H | H | L | 0 | 0 | BINARY LOAD | 0 | 0 | OFFSET |

Figure 14:
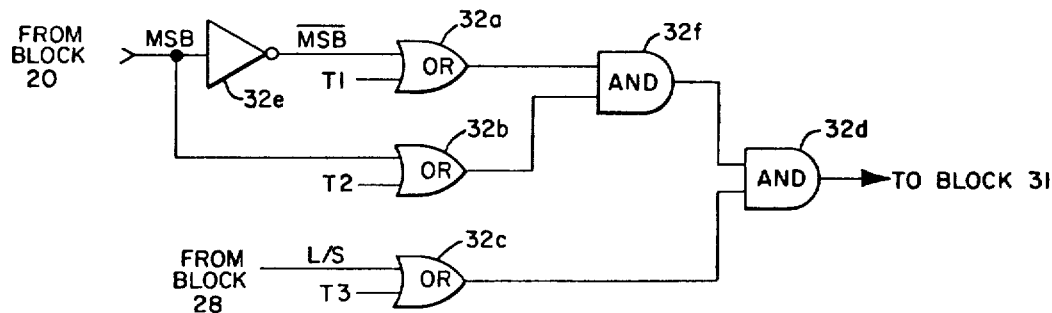
FIG. 14 is a block diagram illustrating in greater detail an add/subtract control circuit that may be employed in the system of FIG. 4.

FIG. 14 illustrates the add/subtract control circuit 32 in the preferred embodiment. As described earlier, the first operation to be performed by the ALU is determination of the digital error, in which the output of ALU 31 is derived from the operation 0±A. If the MSB from the encoder register 20 is low, that is, a short indication, then the operation to be performed is 0+A, while if the MSB is high, that is, a long indication, then the operation to be performed is 0−A.

When T1 goes low (T2 and T3 high), the output of OR 32a is determined by $\overline{MSB}$ (MSB inverted by inverter 30e). With OR 32b and OR 32c producing a high output, one input to each AND 32f and 32d is high, and the output of AND 32d = $\overline{MSB}$. If MSB is low, then the output of AND 32d will be high, causing ALU 31 to add. If MSB is high, the ALU will subtract.

During T2, when the deviation range is determined, the operation to be performed is A±B, where A is the range setting and B is the count in the encoder register 20. If the MSB of the encoder register is low (a short reading), the operation to be performed is A−B. If the MSB is high (a long reading) the operation to be performed is A+B. The output of AND 32d during T2 is equal to MSB.

During T3, A is the number established by the internal switches of binary load 21, and B is the number determined by the offset switches 28. If the board length is to be short, then the operation to be performed is A+B. Setting an offset switch to S produces a high. During T3, the output of AND 32d is equal to S.

Figure 15:
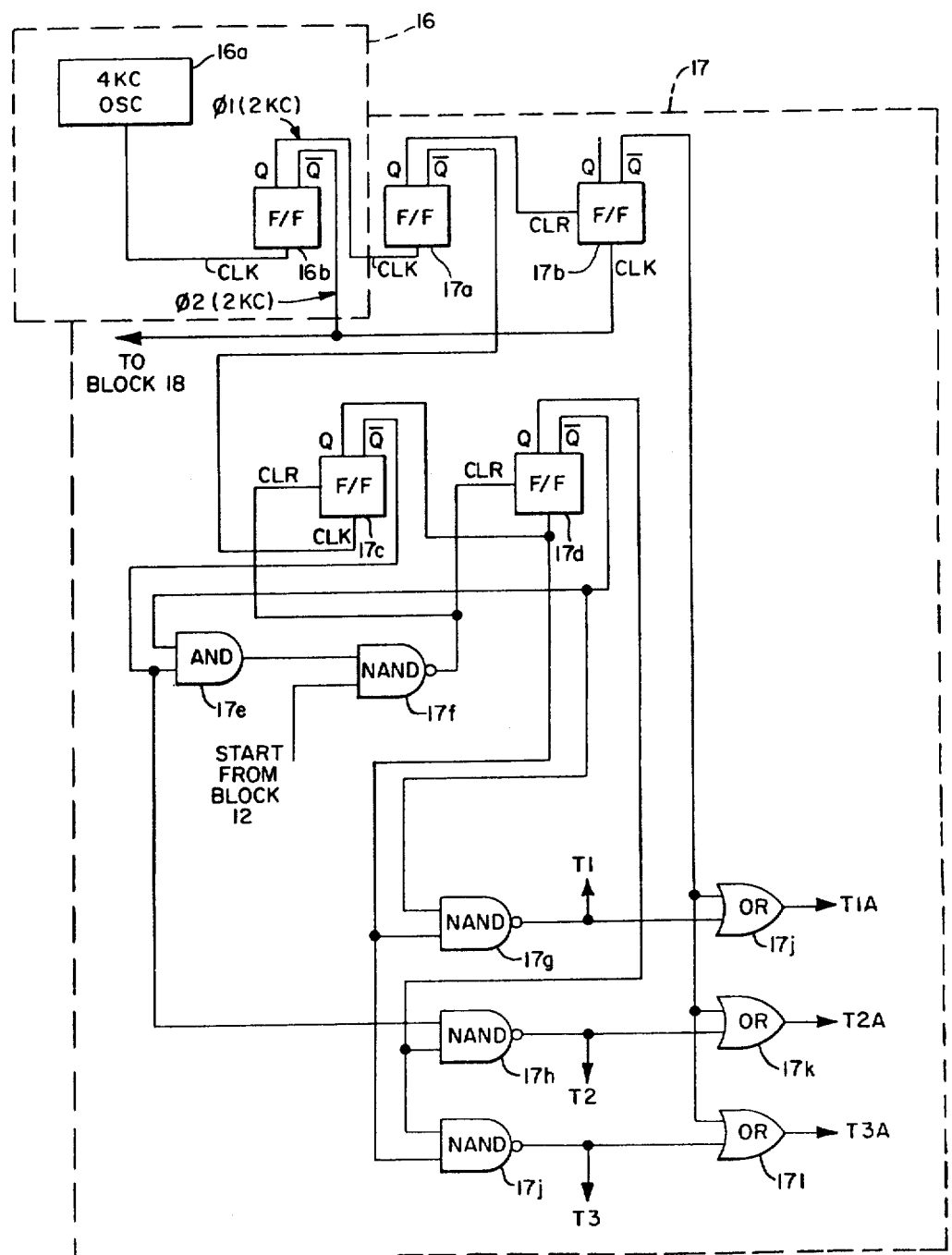
FIG. 15 is a block diagram illustrating in greater detail an oscillator circuit and a timing signal generator circuit that may be employed in the system of FIG. 4.
Figure 16:
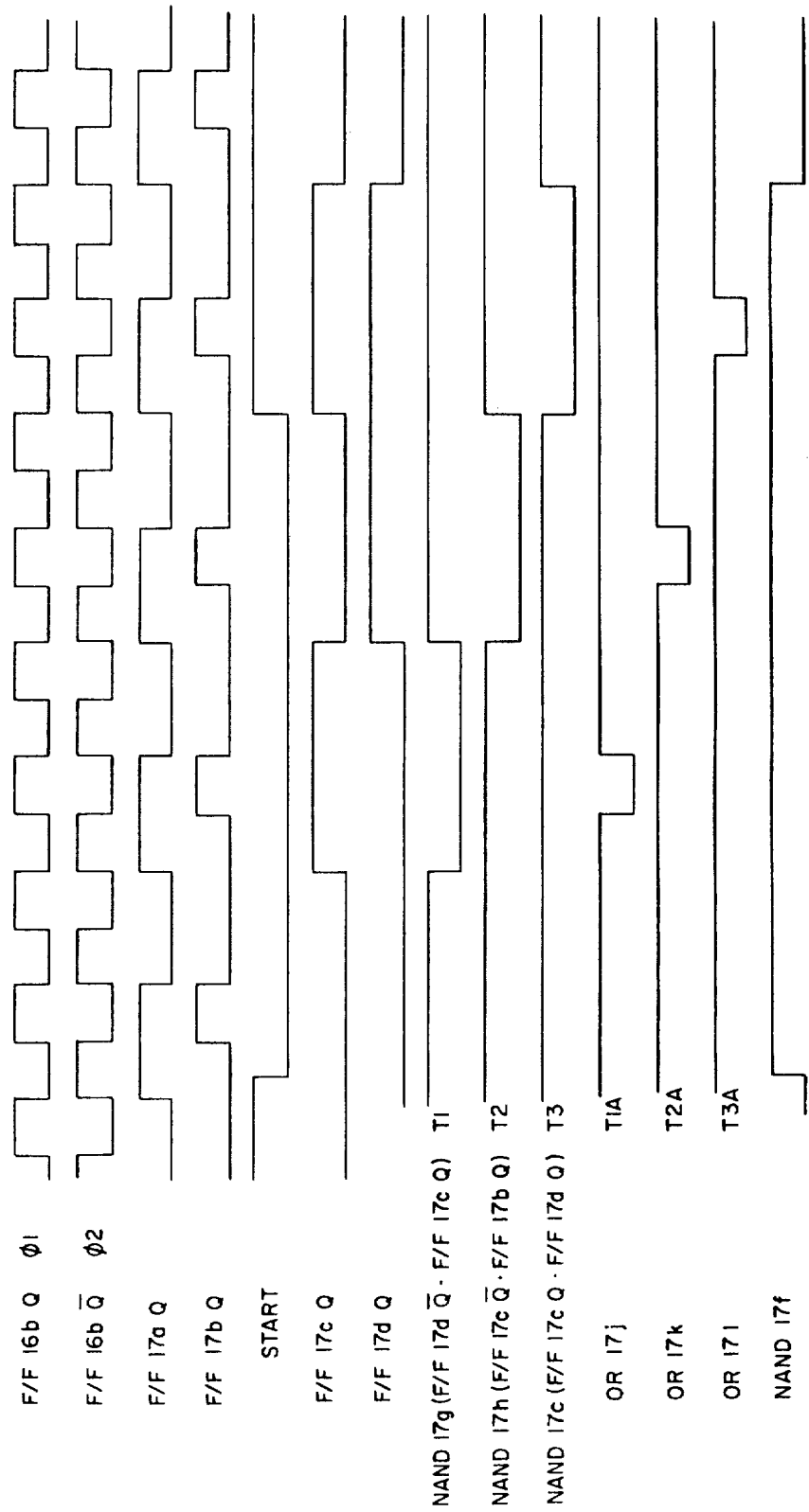
FIG. 16 is a timing diagram illustrating the operation of the circuits of FIG. 15.

FIG. 15 illustrates details of oscillator 16 and timing signal generator 17 in the preferred system of the invention. A 4 KC oscillator 16a may comprise two Schmitt circuits connected in a ring, that is, with the output of a first Schmitt circuit connected to the input of a second Schmitt circuit and the output of the second Schmitt circuit connected to the input of the first Schmitt circuit. The 4 KC output of oscillator 16a is then divided by two in flip-flop 16b to produce a 2 KC symmetrical waveform in two phases as illustrated in FIG. 16. The complementary outputs of flip-flop 16b are applied, respectively, to the clock inputs of flip-flops 17a and 17b of the timing signal generator 17, which also includes flip-flops 17c and 17d. Flip-flops 17c and 17d comprise a "count of four" and are enabled by the start signal from count detector 12.

The flip-flops of blocks 16 and 17 change state on the transition of the signal at their clock input from a high to a low, provided that a high is present at the clear (CLR) input (where a clear input is shown). When a low is present on the CLR input, output Q of the flip-flop will be low and output $\overline{Q}$ will be high. This condition will not be affected by the clock signal.

Output Q from flip-flop 16b provides the input to flip-flop 17a, which provides a divide by 2 output. Output $\overline{Q}$ of flip-flop 16b provides the input to flip-flop 17b, which also provides a divide by 2 output. The timing relationship between flip-flop 17a and 17b is preserved by clearing flip-flop 17b from the Q output of flip-flop 17a. Whenever the Q output of flip-flop 17a is low, then the Q output of flip-flop 17b must also be low. When the Q output of flip-flop 17a goes high, flip-flop 17b will change state when the $\overline{Q}$ output of flip-flop 16b goes low (which is the same as the Q output going high).

Assuming that the start signal from the count detector 12 is high, the "count of 4" signal (flip-flops 17c and 17d) will continue to advance until the $\overline{Q}$ output of flip-flop 17c and the $\overline{Q}$ output of flip-flop 17d are both high. When this happens, AND 17e will produce a high output, and NAND 17f will produce a low output. This low signal prevents any further advance and locks output $\overline{Q}$ of flip-flop 17c and output $\overline{Q}$ of flip-flop 17d in the high state. This state is arbitrarily labelled "count zero."

When a hundred foot board length measurement has been completed, the start signal goes low, as described earlier. This may occur anytime and is not in synchronism with the clock. With a low supplied to NAND 17f, flip-flops 17c and 17d are not cleared, that is, the counter can advance and will do so when the $\overline{Q}$ output of flip-flop 17a goes low (or the Q output goes high). Once the counter has advanced to count 1, L that is, output Q of flip-flop 17c is high and output Q of flip-flop 17d is low, the counter will continue to advance (2, 3, 0) to the 0 state even if the start goes high, since the output of AND 17e is low for counts 1, 2, and 3. Note that the start signal goes high at the onset of T3. This is due to the resetting of the optical counter 11.

The start signal generated from count detector 12 is held in a low state (i.e., "start") whenever the encoder signal is not present (for example, when the press is stopped). Under this condition, the count of 4 counter (flip-flops 17c and 17d) continues to cycle without a halt at 0, since the output of NAND 17f is held high. Pulses T1, T2, T3, T1A, T2A, and T3A are regenerated over and over again via NAND's 17g-17i and OR's 17j-17l. However, no new data is loaded into the 8-bit storage 35 or the 2-bit storage 34 (FIG. 4) due to an inhibit from the detect last hole blank circuit 15, as will be described. But the optical signal counter 11 is reset and the encoder counter 20 is preset during the generation of T3 and T3A. Once the press starts up and the encoder signal is present, the start signal goes high, flip-flops 17c and 17d cycle to count 0, and the system waits for the next good hole to appear. The timing sequence is illustrated in FIG. 16. Pulses T1A, T2A, T3A are used for loading registers during the corresponding timing periods T1, T2, T3.

Figure 17:
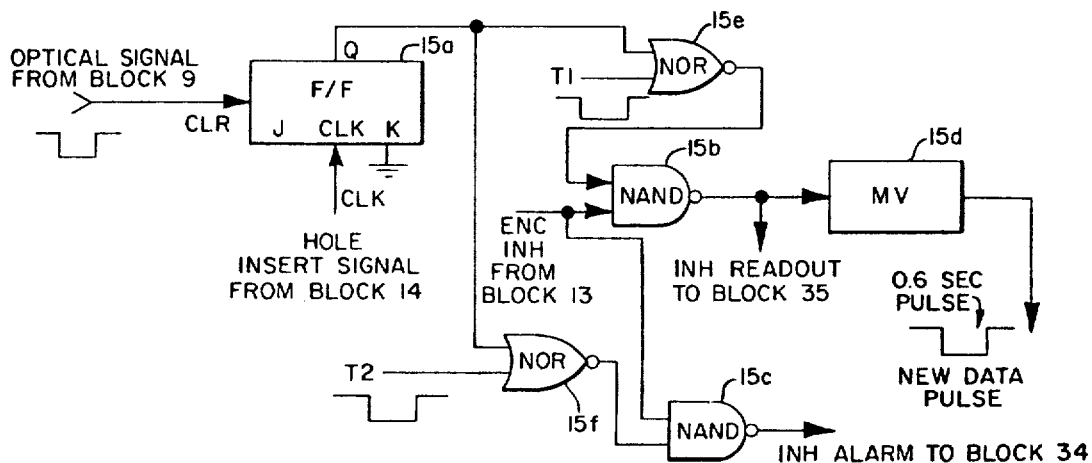
FIG. 17 is a block diagram illustrating in greater detail a "detect last hole blank" circuit that may be employed in the system of FIG. 4.

FIG. 17 illustrates details of the detect last hole blank circuit 15 in the preferred system. In the diagram, flip-flop 15a has the following characteristics: When the clear input (CLR) is low, the Q output is low and independent of the clock signal (CLK). When a high is at the clear input, the flip-flop will change state at the falling edge of the clock signal, and the Q output will go high. Since the K data input is held low and the J data input is held high (open circuit) further transitions of the clock will have no further effect on the Q output, and it will remain high until cleared.

The optical signal will be high until a hole is detected and then will go low. T2 and T1 will be high until the measurement is completed, so the outputs of NOR's 15e and 15f will be low. In this low state, the outputs of NAND's 15b and 15c will be high.

During the measurement cycle, flip-flop 15a will be cleared each time an optical signal is present. If a hanger occurs, the hole insert signal from hole insert signal generator 14 will clock flip-flop 15a, and the Q output will go to a high state. If further hole insert signals are generated, the Q output will still be high, since the K data input is low.

When a measurement cycle is completed, the optical signal as well as the hole insertion signal are inhibited from further transitions (as described earlier). Inhibit of the optical signal causes it to remain high. Inhibit of the hole insert signal (from block 14) is accomplished by gate 19, which is forced to a high state by the encoder start/stop signal from block 12. Q (block 15a) will be low if the last pulse was an optical signal and will be high if it was a hole insert signal.

When T1 goes low, the output of NAND 15b will go low provided that the output Q of flip-flop 15a is low and the encoder inhibit is high (i.e., the press is still running). This transition of NAND 15b to a low state causes the 8-bit storage register 35 (FIG. 4) to be loaded and triggers a multivibrator 15d in order to produce a pulse of about 0.6 seconds, for example, for blanking the display. When T2 goes low, NAND 15c will go low, provided the encoder inhibit is high and output Q of flip-flop 15a is low, causing the 2-bit storage 34 (FIG. 4) to be loaded. However, if the last input to flip-flop 15a was a hole insert signal before the measurement was completed, then the Q output will be high, and this will force NAND's 15b and 15c to remain high, thus preventing the loading of the 8-bit storage and the 2-bit storage and preventing the generation of a new data pulse.

The manner in which the preferred system of FIG. 4 may be employed in a printing press will now be described. It is assumed that the paper has been threaded through the press, including the roller assembly A2 of FIG. 1. The internal switches of the count detector 12 have been preset for a particular board length, taking into consideration the preference that the first and last optical pulses in a measurement series be made by the same punch. The internal binary load switches 21 have also been preset so that for a perfect board length, binary counter 20 will count down to zero, the setting being adjusted, if necessary, to accommodate imperfection in the encoder wheel circumference.

It is desirable that the operator have some control over the selection of board length and for this purpose external offset switches 28 are employed. On some occasions, paper having a high modulus of elasticity (i.e., large tensions are required for small changes in length) cannot be corrected to have a perfect board length. This is the case with "tag" (cardboard-like paper). It is then necessary to adjust the board length to a new standard. A measurement run is made, as will be described, and once the best press adjustment has been made with the "tag" sheet and the deviation is measured, the operator sets offset switches 28 to equal the readout. The offset switches may be constitued by a 3-section digital thumb-wheel switch unit. The first section permits the selection of a long or short offset, and the other sections permit selection of an offset value of up to 3.9 inches, for example. Once the offset has been selected, the board length deviation will be zero if the board length measurement is the same as for the "tag" sheet. The range function (to be described) will operate relative to the new standard board length.

The operator adjusts range switches 26 to establish a long and short range which is acceptable. A two digit thumb-wheel digital switch unit 26 may provide a range selection of up to 3.9 inches, for example. Values outside of the selected range will require a press adjustment. If the deviation from standard board length is equal to or less than the range number set by the operator, a green light, for example, will be energized to designate an acceptable board length. If the deviation is outside the acceptable range, a yellow light, for example, may be energized for "long" and a red light, for example, may be energized for "short," the lights being part of display 8.

When the system is activated, the timing signal generator 17 will commence to cycle, and at T3 the optical register 11 will be reset and the encoder register 20 will be preset by ALU 31 to a number determined by the binary load 21 and the offset switches 28. The system now waits for the first hole to be detected. The first hole detected by the optical system opens gate 19 of the encoder register. This hole and subsequent holes are counted by optical register 11, which counts up while the encoder register counts down in response to encoder pulses.

When the count detector 12 recognizes that the preselected count has been achieved, a start signal is applied to timing signal generator 17, which now generates pulses T1, T2 and T3 (and accompanying pulses T1A, T2A and T3A) in sequence. During T1, the readout error (board length deviation) is determined. The output of encoder register 20 is gated to the B input of the arithmetic logic unit 31, and a zero is gated to the A input. The function A±B is performed. The logic for the selection of ± is established by the most significant bit (MSB) of the encoder register 20. The output of the ALU is converted to BCD from binary code and is placed in storage register 35. Circuit 36 converts the stored BCD information to a 7 segment readout of the deviation, which is displayed by display 37. The MSB of the encoder register establishes the alpha readout of digital display 37 (i.e., L or S).

During T2 the alarm display 8 is energized so as to display whether the measured board length is long, short or good. The output of the encoder register 20 is gated into the B input of ALU 31, and the range switches 26 (converted to binary code) are gated to the A input of the ALU, whereupon the function A±B is performed, the ± being established by the MSB of the encoder register. The alarm conditions are shown in the following truth table:

| MSB ALU OUTPUT | MSB ENC REGISTER | RESULT |
| --- | --- | --- |
| 0 | 0 | Good |
| 1 | 0 | Short |
| 0 | 1 | Good |
| 1 | 1 | Long |

The MSB of the ALU and the encoder register are applied to 2-bit storage circuit 34 and decoded according to the foregoing truth table so as to control energization of the appropriate lamp in the alarm display 8.

During T3, the optical register 11 is set to zero and a preset number is entered into the encoder register 20. The number selected by binary load 21 is gated to the A input of ALU 31, and the setting of the offset switches 28 (converted to binary code) is gated to the B input, whereupon the function A±B is performed. The ± sign is established by the short or long selection of the corresponding offset switch. The output of the ALU is loaded into the encoder register.

When T3 ends, the system is ready for a new measurement cycle and awaits detection of the first hole to start the process over again.

The system of the invention may operate in a manual mode or an automatic mode. In the manual mode the operator changes the tension on the infeed side of the press manually to bring the board length measurement within range. This may be accomplished by energizing a conventional tension motor for a given period of time to alter the web tension. The selected direction of motor rotation depends upon whether the board length is to be increased or decreased. The tension adjustment operation can be performed automatically, however.

Figure 18:
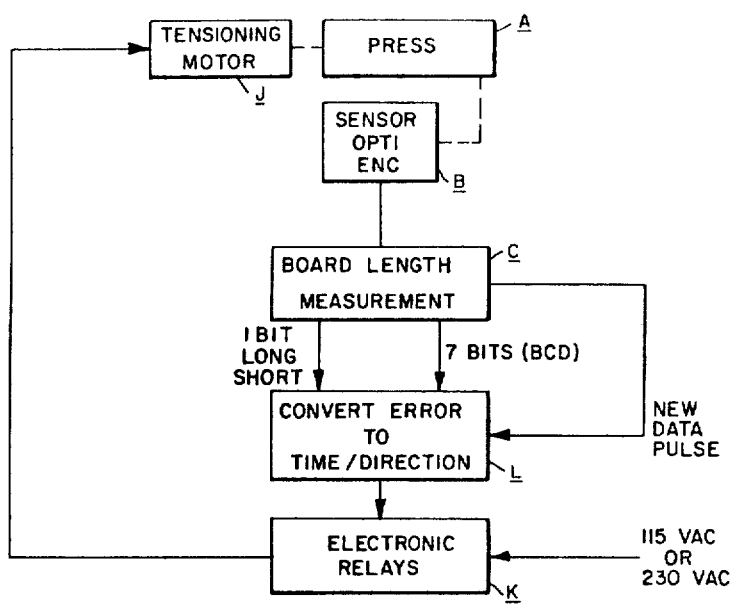
FIG. 18 is a block diagram illustrating utilization of the invention in an automatic feedback system for adjusting web tension.

FIG. 18 illustrates, generally, a system for adjusting board length automatically. The tensioning motor J for adjusting web tension in press A is energized by a 115 or a 230 volt AC voltage supplied to the motor by electronic relays K. Sensor unit B supplies optical and encoder pulses to the main unit C for board length measurement. Main unit C supplies output signals as shown to a convert error to time/direction circuit L, which controls the electronic relays. The phase of the AC voltage supplied to the tensioning motor (and hence the direction of rotation required to correct the board length error) is determined by a long/short bit, and the duration of the voltage is controlled by 7 bits (BCD) and is proportional to the magnitude of the board length error (see FIG. 4 "auxiliary unit servo" output signals). Various types of tension adjusting motors can easily be employed in the automatic system with appropriate modification of the control signals. Stability of the system shown is dependent upon the conversion of the magnitude of the error to a time duration of the AC voltage. Specifically, each 0.1 inch error, for example, must energize the tensioning motor for that period of time which causes a change of approximately 0.1 inch in board length. This, of course, is dependent upon the motor speed, gearing, etc. A variable adjustment permits the time interval to be set so as to accommodate the characteristics of the particular press.

Figure 19:
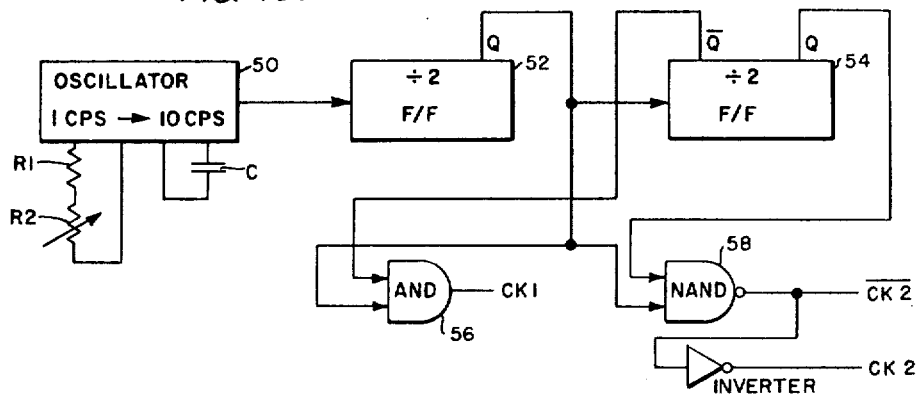
FIG. 19 is a block diagram illustrating a clock generator circuit that may be employed in the system of FIG. 18.
Figure 20:
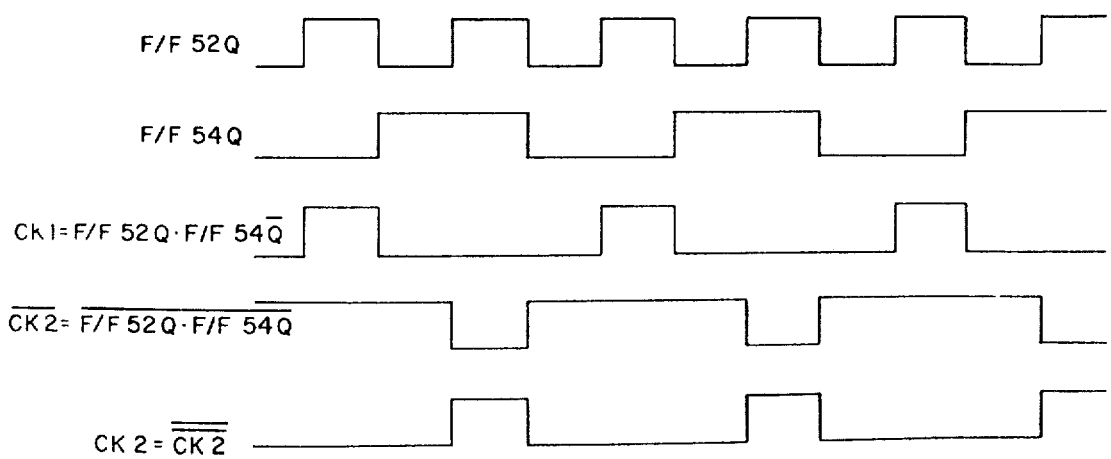
FIG. 20 is a timing diagram illustrating the operation of the circuit of FIG. 19.
Figure 21:
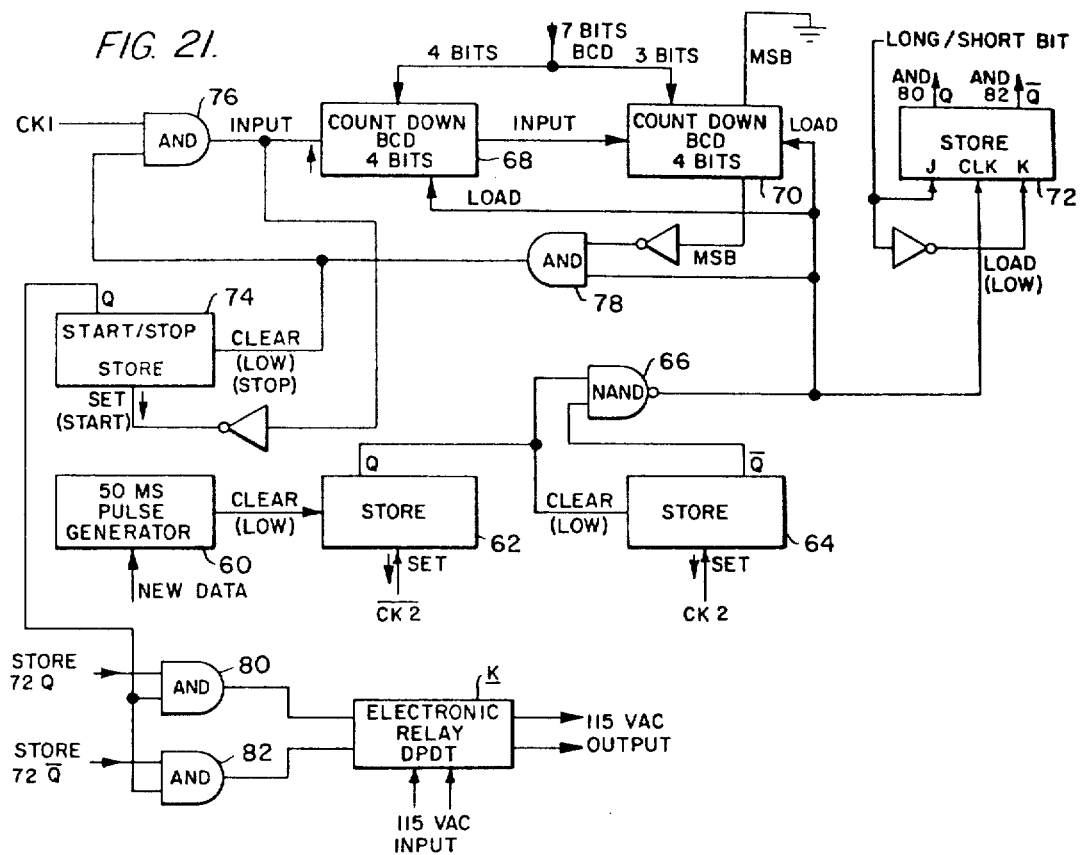
FIG. 21 is a block diagram illustrating a servo control circuit that may be employed in the system of FIG. 18.

Details of a preferred servo system for performing automatic board length adjustments are illustrated in FIGS. 19 and 21, and will be described with reference to the accompanying timing diagrams of FIGS. 20 and 22. FIG. 19 shows a clock generator portion of the system. Oscillator 50 produces a rectangular pulse output whose frequency is determined by $1 \div K(R1+R2)C$, where K may be approximately 0.3. If R2 max = 10 R1, the frequency range of adjustment is 10:1. The value of capacitor C may be established so that the servo system is stable with R2 approximately at its midpoint. For many presses, a frequency range of 1 pulse per second to 10 pulses per second will be appropriate. Two flip-flops 52 and 54 are cascaded in a divide by 2 mode and their outputs are connected to an AND 56 and a NAND 58. The outputs CK1, CK2, and $\overline{CK2}$ of the clock generator circuit are illustrated in FIG. 20.

Figure 22:
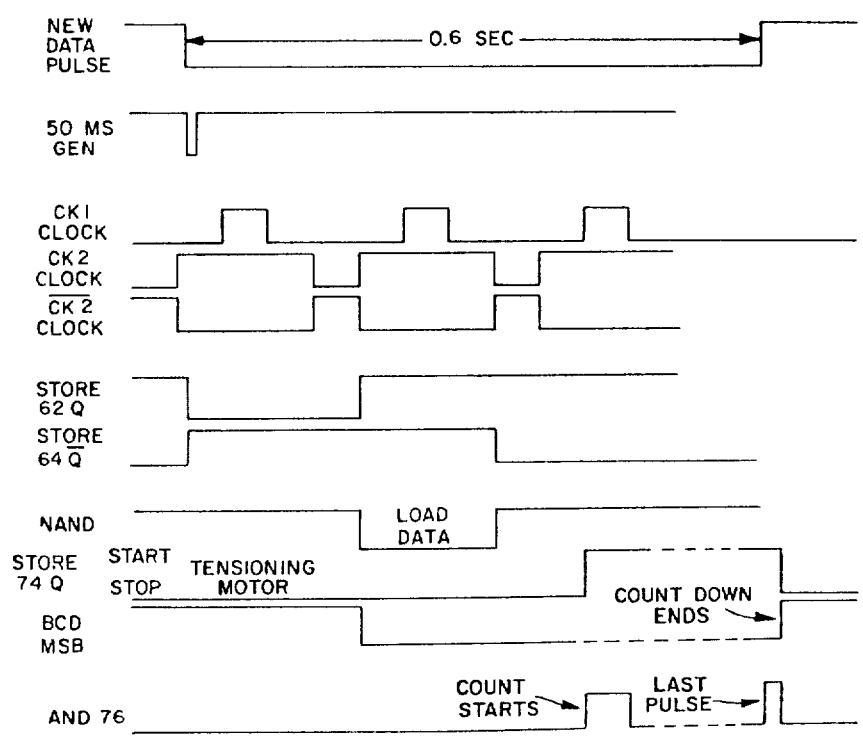
FIG. 22 is a timing diagram illustrating the operation of the circuit of FIG. 21.

Turning now to FIG. 21, and the accompanying timing diagram of FIG. 22, when a new data pulse is received, a 50 MS pulse is generated by generator 60 to clear a store 62, which in turn clears a second store 64. Store 62 is set at the first falling transition of $\overline{CK2}$. Then store 64 is set at the following transition of CK2. Once stores 62 and 64 are set, further transitions have no effect. This results in a single pulse (low) at the output of a NAND 66. This pulse loads the BCD bits (7 bits having a range of 63 counts or 6.3 inch error) into an 8-bit count-down register 68, 70 and a zero (ground) is loaded into the MSB position of the register. In addition, the sign (i.e., long or short) is stored in a single bit register 72. During this loading process a start-stop register (store 74) is cleared (a stop condition) and the clock CK1 input is inhibited via AND 76. At the end of the load pulses, AND gate 76 is opened (both inputs of AND 78 are high and its output goes high) and the count-down register 68, 70 starts to count down.

The first pulse into the count-down register sets the start/stop circuit (store 74). The MSB of the register is always loaded in as a zero, as noted above. It will remain in this state until the count-down register receives one additional pulse after it has reached zero, which causes the bits representing $2^0$ and $2^3$ to go high in each of the 4-bit registers 68, 70 (i.e., the number 99 is generated). When the output bit representing $2^3$ is high in register 70, the inverted MSB output inhibits further pulses from entering the count-down register (via AND 76) and clears the start/stop register 74 (via AND 78) to produce a stop condition.

The complementary outputs Q, $\overline{Q}$ from the long/short single bit store 72 form one input to AND 80 and 82. The second input is supplied from the start/stop register 74. AND's 80 and 82 drive relays K (such as optically isolated relays) which provide the AC power for the tensioning motor.

If the error loaded into register 68, 70 is sufficiently small, the count-down will be completed before the next new data pulse is received. Under this condition, register 74 will be cleared (MSB = 1, a stop condition) and the system will remain in this state until a new data pulse is received.

If the error is large and the register has not counted down, the new data pulse and the 50 MS pulse generator 60 will permit stores 62 and 64 to stop the motor via store 74 and reload data. This new data will drive the tensioning motor to continue its correction. The tensioning motor may adjust web tension by varying the force applied to the web by an idler roller or by varying the speed of one or more driven rollers, for example.

If a zero is loaded into the register, the first pulse into the register will start the tensioning motor. Simultaneously the MSB (having been initially set to zero as well as the other bits) will now go to a one state, which stops the tensioning motor. This sequence of events is so rapid that the motor will not move. In actual design the start pulse to store 74 may be delayed 1 millisecond so that the stop pulse will arrive first and the motor will not be energized. This delay will have negligible effect when the error is greater than zero.

It should be noted that if the last hole in the measurement cycle is a hanger, the new data pulse is suppressed. Without this data pulse, the servo is not activated and waits for the next measurement cycle.

While a preferred embodiment of the invention has been shown and described, it will be apparent to those skilled in the art that changes can be made in this embodiment without departing from the principles and spirit of the invention, the scope of which is defined in the appended claims.

I claim:

1. In apparatus for counting repetitive marks on a running web, means for sensing each mark and producing a corresponding pulse to be counted, and means for determining when such a pulse should have been produced and in the absence of such a pulse generating a pulse to be counted.

2. Apparatus in accordance with claim 1, wherein said generating means comprises means for generating pulses to be counted repetitively until a pulse corresponding to a mark is produced.

3. Apparatus for performing a measurement on a moving web in response to holes spaced along a longitudinal edge of the web, comprising means for producing a pulse in response to each hole as it passes a predetermined location, and means for determining when each such pulse should have been produced and in the absence thereof generating a pulse.

4. A method involving the counting of repetitive marks on a running web, comprising sensing each mark and producing a corresponding pulse to be counted, and determining when such a pulse should have been produced and in the absence of such a pulse generating a pulse to be counted.

5. A method in accordance with claim 4, wherein said generating comprises generating pulses to be counted repetitively until a pulse corresponding to a mark is produced.

6. A method in accordance with claim 4, wherein the marks are holes in the web and the sensing is performed optically, and wherein the determining is dependent upon the advancement of the running web.

* * * * *